United States Patent [19]

Wilkerson et al.

[11] Patent Number: 4,940,011
[45] Date of Patent: Jul. 10, 1990

[54] VALVE ACTUATOR TWO ROTOR THREE POSITION INDICATOR

[75] Inventors: Ivan E. Wilkerson, Lynchburg; Robert W. Auxier, Forest, both of Va.

[73] Assignee: Limitorque Corporation, Lynchburg, Va.

[21] Appl. No.: 354,395

[22] Filed: May 19, 1989

[51] Int. Cl.⁵ .................... F16K 37/00; G01D 13/00
[52] U.S. Cl. ................................. 116/277; 116/303
[58] Field of Search ............... 116/277, 297, DIG. 21

[56] References Cited

U.S. PATENT DOCUMENTS

| 1,778,583 | 10/1930 | Bryant | 116/277 |
| 2,582,556 | 1/1952 | Morey | 116/277 |
| 3,656,504 | 4/1972 | Topinka | 137/363 |

FOREIGN PATENT DOCUMENTS 429686  6/1935  United Kingdom ............... 116/277

OTHER PUBLICATIONS

Auma Publication: "Actuators: Arma Norm: SA 07.1-SA 48.1"; 3 pages; date unknown.
Rotork Publication: Rotork controls Division; "'A'-Range Double-Sealed Valve Actuators"; 5 pages; date unknown.

Primary Examiner—Allan N. Shoap
Assistant Examiner—W. Morris Worth
Attorney, Agent, or Firm—Paul & Paul

[57] ABSTRACT

A two-rotor, three-position indicator for a valve actuator is connected to receive rotary input from at least two independently operating rotors connected inside the geared limit switch of a valve actuator. Individual drive lugs moved interconnected gearing to cause a pointer to indicate whether the valve stem is open, closed or in-between those two oppositely disposed limits.

6 Claims, 3 Drawing Sheets

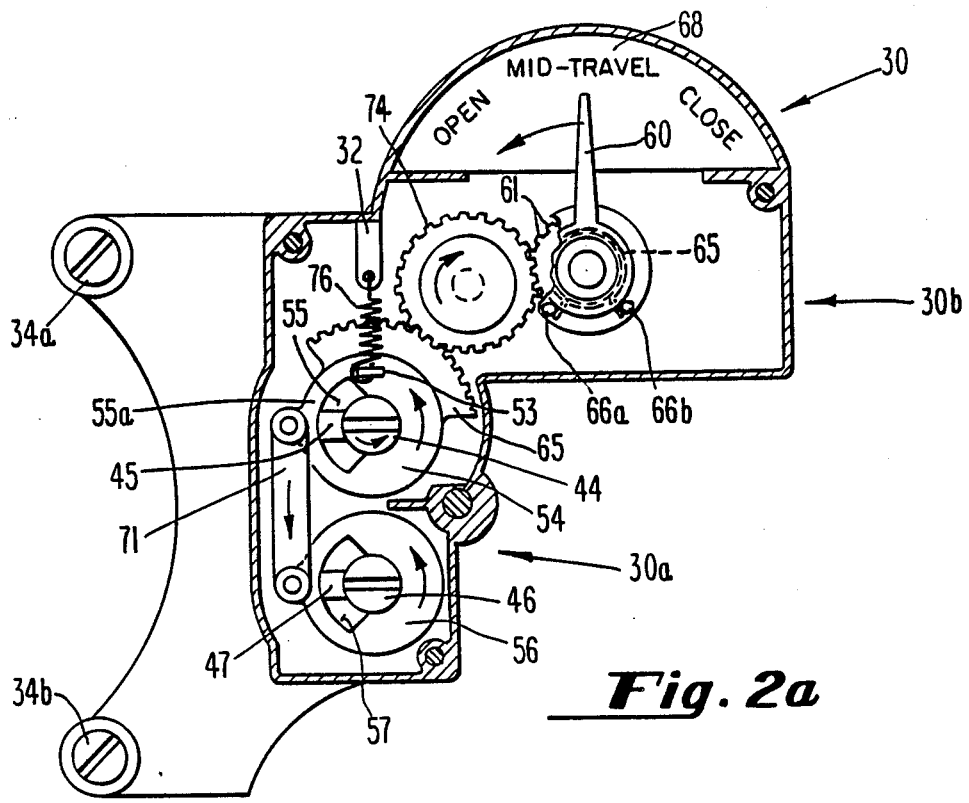
*Fig. 2a*
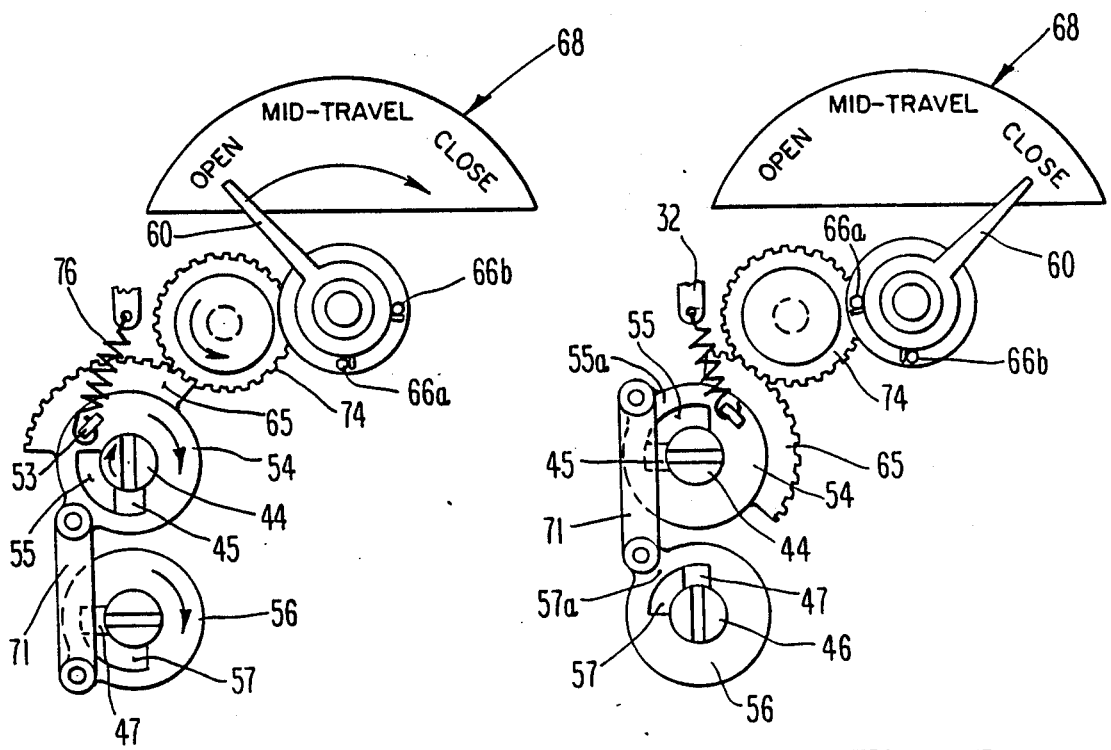
*Fig. 2b*  *Fig. 2c*

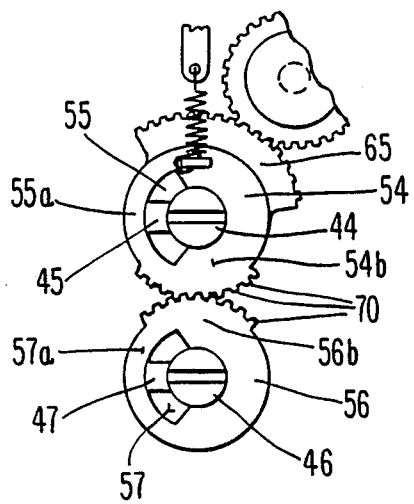
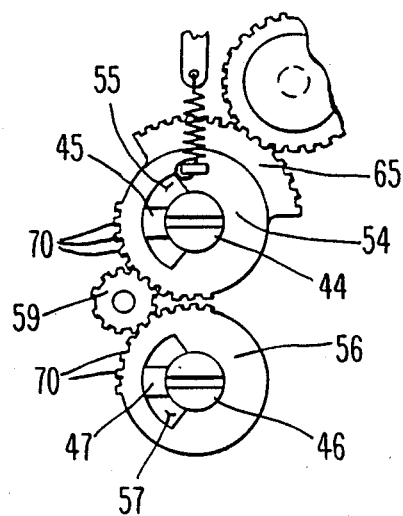
Fig. 3
Fig. 4

VALVE ACTUATOR TWO ROTOR THREE POSITION INDICATOR

BACKGROUND OF THE INVENTION

This invention relates to the use and operation of electromechanical valve actuators. More particularly, it relates to a new device that enables the operator of a valve actuator to have a visual indication of whether the actuator is open, closed or in a mid-travel position.

In many fields, valve actuators are used to open and close valves that control fluid flow. Reference is made to our copending U.S. Pat. application, Ser. No. 188,357, incorporated herein by reference. These electromechanical valve actuators can be found at power generating stations, chemical manufacturing plants, and oil refineries, to name just a few, and they control the opening and closing of the valve and limit the torque and thrust applied to the valve stem. In most all of these situations, the operator must be able to accurately know from his central location what position the valve stem is in and efficiently and quickly control its operation.

Most electromechanical valve actuators contain a geared limit switch which is gear-driven from the actuator power train. The geared section of the switch is essentially a mechanical counter used to count actuator drive sleeve turns. Drive sleeve turns (clockwise or counter-clockwise) are used to predict valve stem location, such as open, closed or mid-travel. The counter section of the geared limit switch may be disengaged (via a clutch) so that counter travel may be set to agree with distinct valve stem locations, i.e. open, closed or mid-travel. When the counter travels through the set points of the switch, the rotary output, taken off of the rotor of the geared counter, is used to make or break electrical contacts.

When it was necessary to have a visual indication of valve position, a practice has been to use the geared limit switch drive as an input to such visual indication. The geared limit switch, which has a plurality of rotors connected to it, is directly connected to the valve drive sleeve which is connected to the valve stem nut, which is connected to the valve stem, which is connected to the valve. Once valve location was analyzed and the number of valve stem turns reconciled with valve position, a device known as a "continuous indicator", was attached to the rotors and used as a position indicator. When using this device, each valve actuator had to be individually analyzed and a special gear box constructed and connected to the rotors so that stem rotations would be indicated on a dial or other visual indicator. This apparatus and the procedure have the disadvantages of requiring a customized gear drive for each valve and the associated labor costs necessary to properly complete the installation work.

SUMMARY OF THE INVENTION

A valve actuator two-rotor, three-position indicator is disclosed. The indicator is directly coupled to two independently-operating rotors, and can comprise either a linkage or a gear-combination that ties movement of the rotors to a single pointer. The single pointer will indicate whether, in accordance with movement of the linkage or the gears, the valve is open, closed or in-between those two states.

OBJECTS OF THE INVENTION

It is therefore an object of the present invention to provide a visual indicator of valve position that shows up to three locations of the valve.

It is another object of the present invention to provide a visual indicator ov valve position that may be installed upon a wide variety of valve actuators without first performing an individual analysis of any of the actuators.

It is still another object of the present invention to provide a visual indicator of valve position that employs a linkage or gear assemble that will fit onto any valve actuator.

These and other features, objects and advantages of the invention will, in part, be pointed out with particularly and will, in part, become obvious from the more detailed description of the invention taken in conjunction with the accompanying drawings which form an integral part thereof.

BRIEF SUMMARY OF THE DRAWINGS

FIG. 2a shows a sectional view of the two-rotor, three-position visual indicator taken along lines 2a—2a of FIG. 1;

FIG. 2b shows a diagrammatic view, similar to FIG. 2a, of the visual indicator showing the valve stem in the open position;

FIG. 2c shows a diagrammatic view, similar to FIG. 2a, of the visual indicator showing the valve stem in the closed position;

FIG. 3 shows a diagrammatic and partial fragmentary view, similar to FIG. 2a, of an alternate embodiment of the gear mechanism of the visual indicator; and FIG. 4 shows a diagrammatic and partial fragmentary view, similar to FIG. 2a, of a second alternate embodiment of the gear mechanism of the visual indicator.

DETAILED DESCRIPTION OF THE PREFERRED EMBODIMENT

Figure 1:
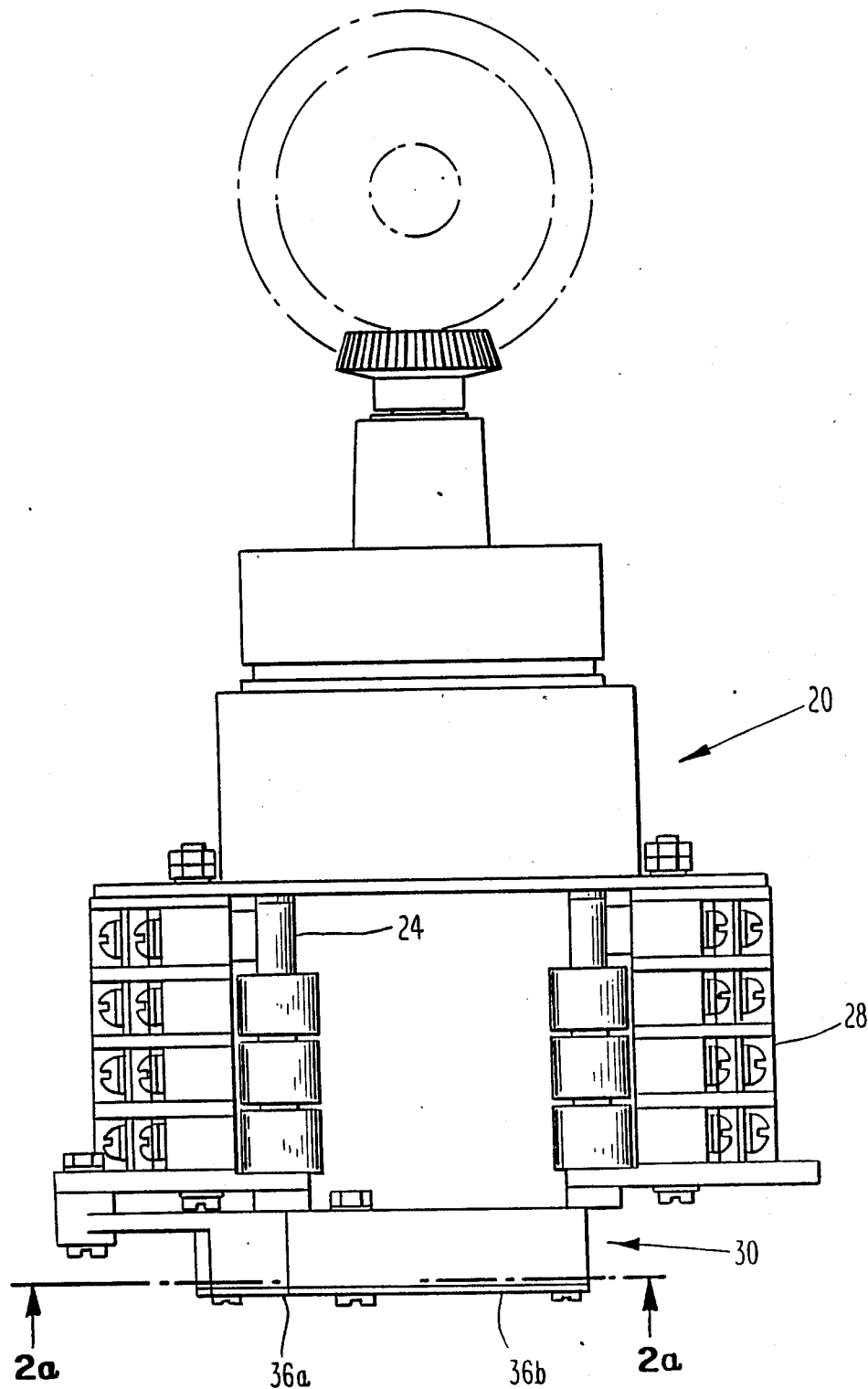
FIG. 1 shows a plan view of a geared limit switch of a valve actuator with the visual indicator of the present invention installed.

Referring now to the drawings in detail, wherein like reference numerals indicate like elements in each of the several views, reference is first made to FIG. 1 which shows a plan view of a valve actuator 20 with a preferred form of housing 30 of two rotor three position indicator 35 attached to two vertically-orientated rotors 24, 26 (only rotor 24 shown in FIG. 1) attached to a geared limit switch 28 of said actuator. FIG. 2a shows a sectional view, taken along lines 2a—2a of FIG. 1, of the indicator 35. As is normally practiced, the geared limit switch rotors are a direct indication of valve position, such as open, closed or in-between. Separate rotors 24, 26 are used to indicate complete open position and complete closed position of the valve, and the two-rotor three-position indicator 35 uses input rotary motion from these two rotors to move an indicator or pointer 60, as will be described.

Housing 30, which has a pair of attachment apertures (not seen in FIG. 2a) through a stabilizing plate 33 for attachment means, such as screws 34a, b, can be made of known plastic or metal materials, and for ease of explanation has its cover plate 36 (see FIG. 1) removed. Housing 30 is appropriately sized to provide a gear section 30a in alignment with the ends of the rotors 24, 26 as shown by rotor end caps 44, 46, and to provide a scale and pointer section 30b adjacent thereto and conveniently carries an opaque part 36a over gear section 30a and a clear, transparent, part 36b over pointer section 30b.

As seen in FIG. 2a, a first rotor endcap 44, is affixed to rotatably project from the end of rotor 24. End cap 44 projects from the end of rotor 24 a predetermined distance and orthogonally carries a lug 45, attached at its mid-section thereof. End cap 44 is affixed to the end of rotor 24, such as by male-female countersunk attachments, as is known. The positioning of lug 45, perpendicular to the lineal dimension of endcap 44, allows transfer of motion from a right cylindrical form to a selected planar form. In a similar manner, end cap 46 projects from the end of rotor 26 and orthogonally carries a lug 47. Lugs 45 and 47 oscillate in the same planar dimension, such as, for purposes of illustration only, the plane of the sheet of drawings.

An important aspect of this device is the cutaway sectors, of approximately 45 angular degrees, in each of concentrically situated rotor hubs 54, 56. Hubs 54, 56 are concentrically and rotatably held adjacent end caps 44, 46, respectively, and can move only in the same plane as drive lugs 45, 47. Each hub 54, 56 has a sector of 45 angular degrees 55, 57 cut out of it, up to a predetermined thickness of permeter 55a, 57a, respectively, and lugs 45, 47 are free to oscillate within this cutaway area, and thus cause no movement of other components, before contacting the outer edges of cutaway areas 55, 57.

A further important feature of the present invention is the connection means between hub 54 and hub 56. In a preferred embodiment, a link 71, of predetermined length, is rotatably fixed to a predetermined position, and carried on, each perimeter 55a and 57a. As shown in FIG. 3, the connection between hubs 54 and 56 can be accomplished by designing a predetermined number of meshing gear teeth 70 at approximately the 6 o'clock and 12 o'clock positions on oppositely disposed outer edges, such as at 54b and 56b. Still another alternative is to place a smaller, rotating gear 59 adjacent hubs 54b and 56b. Still another alternative is to place a smaller, rotating gear 59 adjacent hubs 54 and 56, and place meshing gear teeth 70 at lower and upper quadrants, respectively, as seen in FIG. 4.

Hub 54 also carries for substantially 90 angular degrees, at its outer edge, a gear comb 65. Comb 65 has a predetermined number of teeth that engage an idler gear 74, which is rotatably fixed adjacent thereto. A biasing means, such as spring 76, is fixed between a spring-carrier 53 on the surface of hub 54 and a tab 32 extending from the inside wall of housing 30, as shown, for a purpose to be described.

Gear 74 engages the teeth of drive gear 61, which drive gear 61 rotates about pin 64. Pointer 60 is attached to oscillate between approximately ±90° from a 12 o'clock, or straight up vertical, position adjacent gear 61 by means of a release coil 65 held between posts 66 a, b atop plate 67. Release coil 65 allows for minor variations between movement of drive gear 61 and pointer 60 when pointer 60 reaches either extreme, as at the "open" or "close", position according to the predetermined scale 68.

With reference to FIGS. 2a, 3 and 4, rotors 24 and 26 are used as input to either a linkage, as shown in FIG. 2a, or gear arrangement, as shown in FIGS. 3 and 4, which drives an indicator. Either rotor 24 or 26 may be designated as the open rotor and for purposes of this illustration, rotor 24 is designated open and rotor 26 is designated close. Rotors 24 and 26, and lugs 45 and 47, are free to rotate within the open portions of hubs 54 and 56 for approximately ±45° (i.e., rotors and hubs have the same axis but are mechanically coupled only when the rotor rotation exceeds approximately 45°). This invention makes the drive lug integral with the rotor. The use of open slotted hubs 54 and 56 allow for untransmitted motion through part of the rotation cycle.

With reference to FIG. 2a, rotor 24 rotates (trips) counterclockwise through 90° when the geared limit switch reaches the preset open position. For all other positions, rotor 24 is stationary throughout valve travel. FIG. 2a shows both rotors 24, 26 in the mid-travel position (somewhere between open and close); neither rotors are tripped in this position. When the open position is reached during operation, rotor 24 goes into a 90° counterclockwise rotation. During the first approximate 45° of rotor travel, drive lug 45 is moving in the open sector of hub 54. At approximately 45° rotation, drive lug 45 engages hub 54 which in turn begins to drive pointer 60 through idler gear 74. At the same time, link 71 transmits motion to hub 56 (rotor 26 and drive lug 47 remain stationary). Link 71 and hub 56 are stationary during the first 45° of rotation of hub 54. The motion of rotor 24, lug 45, and hub 54 continue until the approximate 90° full rotor travel is achieved. At that position, hub 56 has rotated approximately 45° counterclockwise, but has not engaged drive lug 47. Pointer 60 has rotated counterclockwise approximately 45° to indicate the open position.

When the actuator receives a valve close signal and begins to move in the close direction, rotor 24 immediately begins a 90° rotation clockwise back to the neutral position. As drive lug 45 rotates clockwise, hub 54 is spring returned by spring 76 to the neutral (mid-travel) position.

As the valve travels between open and close, rotors 24 and 26 are stationary and all components are in the neutral position. When the valve reaches the close position, rotor 26 begins a 90° clockwise rotation. After approximately 45° rotation, lug 47 engages hub 56 which, in turn, drives pointer 60 clockwise to the close position. Throughout the clockwise rotation of rotor 26, rotor 24 remains stationary.

The embodiments shown in FIGS. 3 and 4 perform in the same manner as earlier described with the exception that hubs 54 and 56 are gear coupled as opposed to link coupled. An arrangement as shown in FIG. 3 would be used when both rotors 24, 26 were required to rotate (trip) in the same direction. Also, if the direction of rotation of Rotors 24 and 26 were reversed, scale 68 which reads "Open-Close" would be reversed to read "Close-Open".

Since the instant invention functions independently of total valve travel, it does not have to be specifically assembled or geared for different valve travels (i.e., the same indicator works for all valve travels). The three position indicator is packaged so that it may be installed and removed as an assembly.

We claim:

1. A visual indicator for a valve actuator that is attached directly to the outer ends of at least two rotors connected to the geared limit switch of said actuator, comprising:

(a) a first end cap attached to rotate with the end of a first rotor;
(b) a second end cap attached to rotate with the end of a second rotor;
(c) a first, circular hub plate concentric with and adjacent to said first end cap, and having a first open area therein of predetermined angular dimensions;
(d) a second, circular hub plate concentric with and adjacent to said second end cap, and having an open area therein of substantially equal predetermined angular dimensions as the first open area;
(e) a first drive lug rotatively connected to said first end cap to oscillate within the first open area;
(f) a second drive lug rotatively connected to said second end cap to oscillate within the second open area;
(g) a connection link rotationally extending between a predetermined point on said first hub plate and a predetermined point on said second hub plate;
(h) a first predetermined number of gear teeth, attached to an outer circumferencial edge of said first hub plate;
(i) an idler gear arranged to be in meshing relationship with said gear teeth;
(j) a drive gear arranged to be in meshing relationship with said idler gear, said drive gear carrying an indicator pointer;
(k) a housing to provide stability for said hubs and related components said housing including an indicator scale arranged to cooperate with said pointer to indicate valve position and;
(l) a tension spring fixed at one end to said housing and at the other end to a predetermined point on said first hub plate.

2. A visual indicator for a valve actuator that is attached directly to the outer ends of at least two rotors connected to the geared limit switch of said actuator, comprising:
(a) a first end cap attached to rotate with the end of a first rotor;
(b) a second end cap attached to rotate with the end of a second rotor;
(c) a first, circular hub plate concentric with and adjacent to said first end cap, and having a first open area therein of predetermined angular dimensions;
(d) a second, circular hub plate concentric with and adjacent to said second end cap, and having an open area therein of substantially equal predetermined angular dimensions as the first open area;
(e) a first drive lug rotatively connected to said first end cap to oscillate within the first open area;
(f) a second drive lug rotatively connected to said second end cap to oscillate within the second open area;
(g) a first predetermined number of gear teeth, attached to an outer circumferencial edge of said first hub plate;
(h) an idler gear arranged to be in meshing relationship with said gear teeth;
(i) a drive gear arranged to be in meshing relationship with said idler gear, said drive gear carrying an indicator pointer;
(j) a second predetermined number of gear teeth attached to the outer circumferencial edge of said first hub plate;
(k) a third predetermined number of gear teeth attached to an outer circumferencial edge of said second hub plate in meshing relationship with said second number of teeth;
(l) a housing to provide stability for said hubs and related components, said housing including an indicator scale arranged to cooperate with said pointer to indicator valve position; and
(m) a tension spring fixed at one end to said housing and at the other end to a predetermined point on said first hub plate.

3. A visual indicator for a valve actuator that is attached directly to the outer ends of at least two rotors connected to the geared limit switch of said actuator, comprising;
(a) a first end cap attached to rotate with the end of a first rotor;
(b) a second end cap attached to rotate with the end of a second rotor;
(c) a first, circular hub plate concentric with and adjacent to said first end cap, and having a first open area therein of predetermined angular dimensions;
(d) a second, circular hub plate concentric with and adjacent to said second end cap, and having an open area therein of substantially equal predetermined angular dimensions as the first open area;
(e) a first drive lug rotatively connected to said first end cap to oscillate within the first open area;
(f) a second drive lug rotatively connected to said second end cap to oscillate within the second open area;
(g) a first predetermined number of gear teeth attached to an outer circumferencial edge of said first hub plate;
(h) an idler gear arranged to be in meshing relationship with said gear teeth;
(i) a drive gear arranged to be in meshing relationship with said idler gear, said drive gear carrying an indicator pointer;
(j) gear means connected between said first and said second plates for providing mutual rotation of said first and second plates;
(k) a housing to provide stability for said hubs and related components, said housing including an indicator scale arranged to cooperate with said pointer to indicate valve position; and
(l) a tension spring fixed at one end to said housing and at the other end to a predetermined point on said first hub plate.

4. A visual indicator for a valve actuator, that controls a valve stem, that is attached directly to the outer ends of two rotors connected to the geared limit switch of said actuator, comprising:
housing means attached to valve actuator;
a first means inside said housing means connected to a first rotor and rotatable therewith to drive a first lug;
a second means inside said housing means connected to a second rotor and rotatable therewith to drive a second lug;
a first gear means concentric with said first means and movably responsive to drive force exerted by said first lug;
a second gear means concentric with said second means and movably responsive to drive force exerted by said second lug;

linking means for rotatably connecting said first and second gear means; and indicator means connected to said first gear means and controllably rotatable between predetermined positions to show relative location of the valve stem.

5. A visual indicator for a valve actuator as described in claim 4 wherein said linking means comprises a bar rotatably fixed to a predetermined point on said first and said second gear means.

6. A visual indicator for a valve actuator as described in claim 4 wherein said first and second gear means comprises circular shaped plates having a predefined sector removed therefrom to allow oscillatory movement of said first and second lugs, respectively therein.

* * * * *

UNITED STATES PATENT AND TRADEMARK OFFICE
CERTIFICATE OF CORRECTION

PATENT NO. : 4,940,011

DATED : July 10, 1990

INVENTOR(S) : Ivan E. Wilkinson and Robert W. Auxier

It is certified that error appears in the above-identified patent and that said Letters Patent is hereby corrected as shown below:

On the title page item [75] Inventors: The first inventor's name "Wilkerson" should be --Wilkinson--.

Column 2, line 7, "ov" should be --of--.

Column 2, lines 17 and 18, "particularly" should be --particularity--.

Column 3, line 27, "permeter" should be --perimeter--.

Signed and Sealed this

Seventeenth Day of March, 1992

Attest:

HARRY F. MANBECK, JR.

*Attesting Officer*     *Commissioner of Patents and Trademarks*